(12) United States Patent
Jordan, Jr. et al.

(10) Patent No.: US 9,903,231 B2
(45) Date of Patent: Feb. 27, 2018

(54) SYSTEM AND METHOD FOR WARMING UP A STEAM TURBINE

(71) Applicant: General Electric Company, Schenectady, NY (US)

(72) Inventors: Harold Lamar Jordan, Jr., Greenville, SC (US); TsungPo Lin, Johns Creek, GA (US); John Edward Sholes, Jr., Kings Mountain, NC (US)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 13/688,467

(22) Filed: Nov. 29, 2012

(65) Prior Publication Data

US 2013/0152587 A1    Jun. 20, 2013

Related U.S. Application Data

(60) Provisional application No. 61/570,540, filed on Dec. 14, 2011.

(51) Int. Cl.
*F01K 13/00* (2006.01)
*F02C 6/18* (2006.01)
(Continued)

(52) U.S. Cl.
CPC .............. *F01K 13/00* (2013.01); *F01D 19/00* (2013.01); *F01D 19/02* (2013.01); *F01D 25/10* (2013.01);
(Continued)

(58) Field of Classification Search
CPC .... F01K 3/22; F01K 13/00; F02C 6/18; F02C 6/00
(Continued)

(56) References Cited

U.S. PATENT DOCUMENTS 3,422,800 A * 1/1969 Haye .............................. 122/7 R
4,028,884 A * 6/1977 Martz ................... F01K 23/108
60/39.182
(Continued)

FOREIGN PATENT DOCUMENTS

EP    0928882 A1    7/1999
JP    54118902 A    9/1979
(Continued)

OTHER PUBLICATIONS

Unofficial English translation of Office Action issued in connection with corresponding CN Application No. 201210544142.5 on Apr. 3, 2015.
(Continued)

*Primary Examiner* — Mark Laurenzi
*Assistant Examiner* — Mickey France
(74) *Attorney, Agent, or Firm* — Fletcher Yoder, P.C.

(57) ABSTRACT

A system for warming up a steam turbine includes a gas turbine and a controller operably connected to the gas turbine. The controller is programmed to receive a plurality of measured input signals and control the gas turbine to produce an exhaust having a desired energy. A first measured input signal is reflective of a measured operating parameter of the gas turbine and a second measured input signal is reflective of an operating parameter of the steam turbine. A method for warming up a steam turbine includes sending a plurality of measured input signals to a controller, wherein a first measured input signal reflects a measured operating parameter of a gas turbine and a second measured input signal reflects an operating parameter of the steam turbine. The method further includes controlling the gas turbine based on the plurality of measured input signals and producing an exhaust from the gas turbine, wherein the exhaust has a desired energy.

18 Claims, 3 Drawing Sheets

(51) Int. Cl.
  *F01D 19/00* (2006.01)
  *F01D 19/02* (2006.01)
  *F01D 25/10* (2006.01)
  *F02C 9/00* (2006.01)
  *F01K 23/10* (2006.01)
  *F02C 9/28* (2006.01)

(52) U.S. Cl.
  CPC .............. *F01K 23/101* (2013.01); *F02C 6/18* (2013.01); *F02C 9/00* (2013.01); *F02C 9/28* (2013.01); *F05D 2220/72* (2013.01); *F05D 2260/20* (2013.01); *F05D 2270/301* (2013.01); *F05D 2270/303* (2013.01); *F05D 2270/3061* (2013.01); *F05D 2270/311* (2013.01); *F05D 2270/313* (2013.01); *F05D 2270/332* (2013.01); *F05D 2270/335* (2013.01)

(58) Field of Classification Search
  USPC ........................................................ 60/645
  See application file for complete search history.

(56) References Cited

U.S. PATENT DOCUMENTS

| | | | | |
|---|---|---|---|---|
| 4,589,255 | A * | 5/1986 | Martens | F01D 17/085 60/646 |
| 5,044,152 | A * | 9/1991 | Hoizumi | F01K 23/101 60/39.182 |
| 5,301,499 | A * | 4/1994 | Kure-Jensen et al. | 60/773 |
| 5,473,898 | A * | 12/1995 | Briesch | F01K 23/10 60/646 |
| 5,584,172 | A * | 12/1996 | Oguchi | B01D 53/8625 60/39.24 |
| 6,128,895 | A | 10/2000 | Takahama et al. | |
| 7,021,062 | B2 * | 4/2006 | Tanaka et al. | 60/773 |
| 7,742,904 | B2 | 6/2010 | Healy et al. | |
| 7,966,802 | B2 * | 6/2011 | Szepek et al. | 60/39.281 |
| 2001/0023576 | A1 * | 9/2001 | Rollins, III | F01K 23/105 60/772 |
| 2001/0034582 | A1 * | 10/2001 | Umezawa | G05B 23/024 702/136 |
| 2002/0029557 | A1 * | 3/2002 | Tobo | F02C 9/28 60/39.091 |
| 2004/0045300 | A1 | 3/2004 | Dovali-Solis | |
| 2007/0055392 | A1 | 3/2007 | D'Amato et al. | |
| 2009/0055105 | A1 * | 2/2009 | Yoshida | F02D 41/0007 702/33 |
| 2009/0112374 | A1 * | 4/2009 | Kirchhof | F01K 13/02 700/287 |
| 2009/0292436 | A1 | 11/2009 | D'Amato et al. | |
| 2010/0300062 | A1 * | 12/2010 | Ewens | F01D 17/08 60/39.24 |
| 2011/0174240 | A1 * | 7/2011 | Bairley et al. | 122/406.5 |

FOREIGN PATENT DOCUMENTS

| | | |
|---|---|---|
| JP | H03-290006 A | 12/1991 |
| JP | H05-195720 A | 8/1993 |
| JP | H07-34810 A | 2/1995 |
| JP | H07-83074 A | 3/1995 |
| JP | H07-310505 A | 11/1995 |
| JP | H10-18809 A | 1/1998 |
| JP | 10238311 A | 9/1998 |
| JP | H11-50811 A | 2/1999 |
| JP | H11-81919 A | 3/1999 |
| JP | H11-218004 A | 8/1999 |
| JP | 2000-110508 A | 4/2000 |
| JP | 2000-282809 A | 10/2000 |
| JP | 2001-193413 A | 7/2001 |
| JP | 2002-070506 A | 3/2002 |
| JP | 2009-156033 A | 7/2009 |
| RU | 2266414 C2 | 12/2005 |

OTHER PUBLICATIONS

Unofficial English translation of Japanese Search Report issued in connection with corresponding JP Application No. 2012-273888 dated Sep. 27, 2016.

Unofficial English translation of Notification of Reasons for Refusal issued in connection with corresponding JP Application No. 2012-273888 dated Oct. 4, 2016.

* cited by examiner

SYSTEM AND METHOD FOR WARMING UP A STEAM TURBINE

RELATED APPLICATIONS

The present application is based upon and claims priority to U.S. Provisional Patent Application No. having Ser. No. 61/570,540 filed on Dec. 14, 2011, which is incorporated herein in its entirety by reference thereto for all purposes. Any disclaimer that may have occurred during prosecution of the above-referenced application(s) is hereby expressly rescinded.

FIELD OF THE INVENTION

The present invention generally involves a system and method for warming up a steam turbine.

BACKGROUND OF THE INVENTION

A conventional combined cycle power plant generally includes a gas turbine, a heat recovery steam generator (HRSG), and a steam turbine. Exhaust from the gas turbine may be used to generate steam which in turn expands in the steam turbine to produce work. For example, expansion of the steam in the steam turbine may rotate a rotor connected to a generator to produce electricity.

The steam turbine and rotor may be subjected to substantial thermal transients, particularly during heat-up of the steam turbine. The thermal transients in turn may create substantial thermal stresses along the rotor which, if not carefully controlled, may reduce the low cycle fatigue and/or useful life of the rotor. As a result, heat-up limits may be applied to the steam turbine to ensure that the maximum designed heat-up rates of the steam turbine and/or rotor are not exceeded. Since the exhaust from the gas turbine is typically used to heat the steam turbine, the heat-up limits may in turn be applied to the gas turbine. In many cases, the heat-up limits applied to the gas turbine are not associated with actual measured parameters of the gas turbine and are instead "surrogate" limits which, if met, will ensure that the actual limits are also not exceeded. The surrogate limits may include, for example, limits or holds on the power output of the gas turbine and/or on the fuel flow to the gas turbine.

Although effective at limiting the heat-up rate of the steam turbine and rotor, in some instances the surrogate limits applied to the gas turbine may be slightly inaccurate and/or unnecessarily restrictive as a result of changes in local operating conditions. For example, changes in the ambient temperature or humidity may produce corresponding changes in the gas turbine exhaust temperature and/or exhaust flow rate for a given power output and/or fuel flow. As a result, the surrogate limits on the power output of the gas turbine and/or the fuel flow to the gas turbine may not produce the desired exhaust temperature and/or exhaust flow rate to the heat recovery steam generator to achieve the optimum heat-up rate in the steam turbine. Therefore, an improved system and method for warming up a steam turbine and rotor would be useful.

BRIEF DESCRIPTION OF THE INVENTION

Aspects and advantages of the invention are set forth below in the following description, or may be obvious from the description, or may be learned through practice of the invention.

One embodiment of the present invention is a system for warming up a steam turbine that includes a gas turbine and a controller operably connected to the gas turbine. The controller is programmed to receive a plurality of measured input signals and control the gas turbine to produce an exhaust having a desired energy. A first measured input signal is reflective of a measured operating parameter of the gas turbine and a second measured input signal is reflective of an operating parameter of the steam turbine.

Another embodiment of the present invention is a method for warming up a steam turbine that includes sending a plurality of measured input signals to a controller, wherein a first measured input signal reflects a measured operating parameter of a gas turbine and a second measured input signal reflects an operating parameter of the steam turbine. The method further includes controlling the gas turbine based on the plurality of measured input signals and producing an exhaust from the gas turbine, wherein the exhaust has a desired energy.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
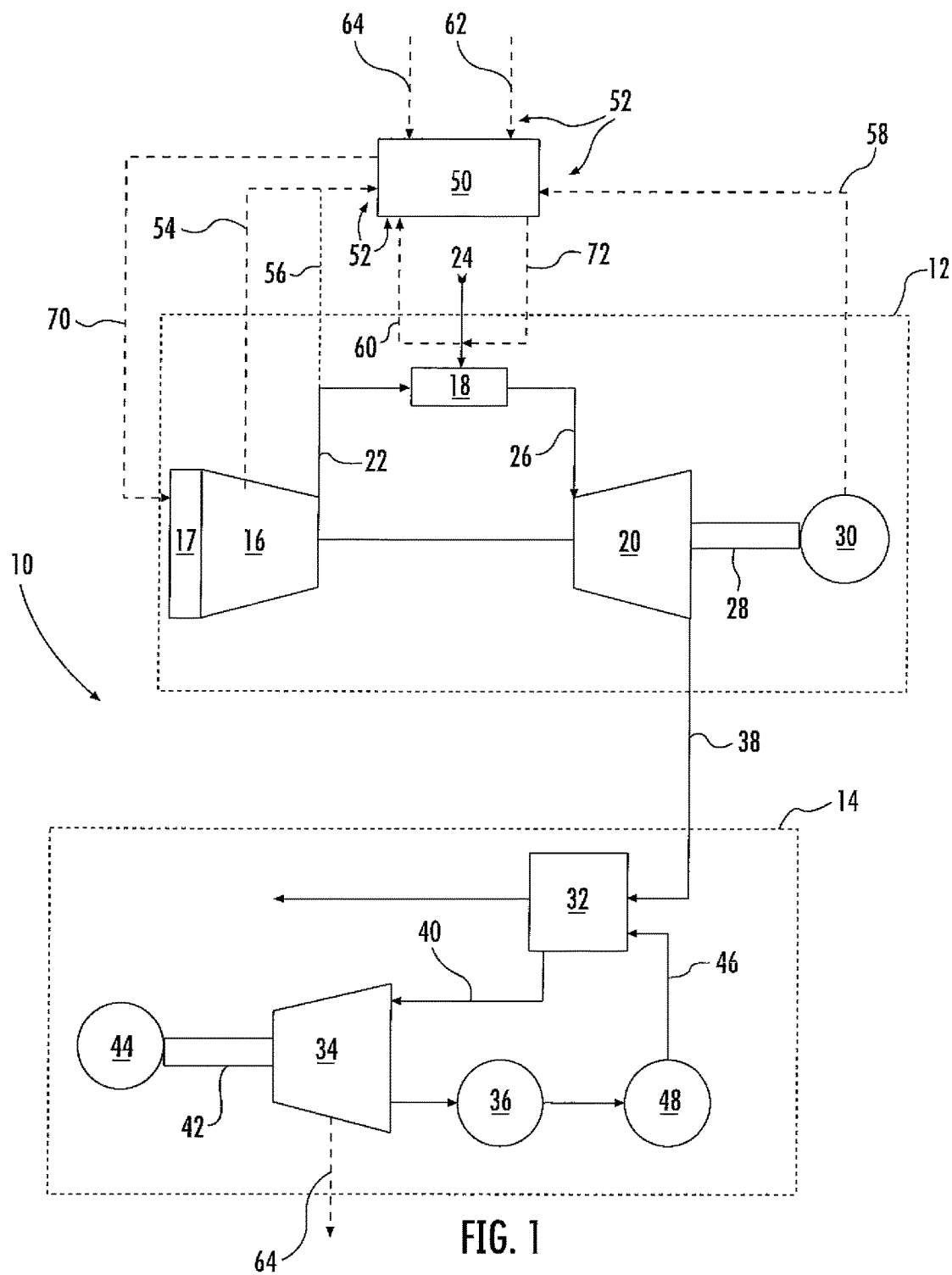
FIG. 1 is a simplified block diagram of an exemplary combined cycle power plant according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents."

Various embodiments of the present invention include a system and method for warming up a steam turbine. In particular embodiments, the system may include a model-based strategy or algorithm programmed into a controller to produce gas turbine cycle conditions that are otherwise not specifically measured. For example, a thermodynamic model in a controller may be tuned to calculate and produce a desired gas turbine exhaust energy, temperature, and/or flow rate based on measured gas turbine parameters, ambient conditions, and/or the initial temperature of the steam turbine. The desired exhaust energy, temperatures, and/or flow rates may in turn be used to achieve an optimum heat-up rate for the steam turbine that minimizes the time to warm the steam turbine without exceeding any heat-up limits. This methodology removes the uncertainty associated with surrogate limits, such as a gas turbine output, to establish the necessary and sufficient conditions to warm the steam turbine. Additionally, since the required steam turbine start-up conditions are a function of the initial thermal state of the steam turbine, rather than ambient conditions, the method provides a means to provide the required conditions for a range of ambient conditions without the need to validate the gas turbine response for the entire ambient operating range.

FIG. 1 provides an exemplary combined cycle power plant 10 to illustrate one possible application of various embodiments of the present invention. As shown, the combined cycle power plant 10 generally includes a gas turbine 12 connected to a heat recovery system 14 as is known in the art. The gas turbine 12 may include a compressor 16, at least one combustor 18 downstream from the compressor 16, and a turbine 20 downstream from the combustor 18. The compressor 16 may include inlet guide vanes 17 that open or close to regulate the flow of air into the compressor 16, and the compressor 16 produces a compressed working fluid 22 which flows to the combustor 18. The combustor 18 generally combines the compressed working fluid 22 with a supply of fuel 24 and/or diluent and ignites the mixture to produce combustion gases 26. The supplied fuel 24 may be any suitable fuel used by commercial combustion engines, such as blast furnace gas, coke oven gas, natural gas, vaporized liquefied natural gas (LNG), propane, and any form of liquid fuel. The diluent may be any fluid suitable for diluting or cooling the fuel, such as compressed air, steam, nitrogen, or another inert gas. The combustion gases 26 flow to the turbine 20 where they expand to produce work. For example, expansion of the combustion gases 26 in the turbine 20 may rotate a rotor 28 connected to a generator 30 to produce electricity.

The heat recovery system 14 may be retrofitted or added to existing gas turbines to increase the overall thermodynamic efficiency of the gas turbine while also reducing oxygen emissions. The heat recovery system 14 may include, for example, a heat exchanger 32, such as a steam generator, a steam turbine 34, and a condenser 36. The heat exchanger or steam generator 32 may be located downstream from the turbine 20 so that exhaust gases 38 from the turbine 20 flow through the steam generator 32 to produce steam 40. The steam turbine 34 may be located downstream from the steam generator 32, and the steam 40 from the steam generator 32 expands in the steam turbine 34 to produce work. For example, expansion of the steam 40 in the steam turbine 34 may rotate a rotor 42 connected to a generator 44 to produce electricity. In particular embodiments, the rotor 42 and generator 44 may be the same rotor 28 and generator 30 previously described with respect to the gas turbine 12. The condenser 36 may be located downstream from the steam turbine 34 and upstream from the steam generator 32 to condense the steam 40 exiting the steam turbine 34 into condensate 46 which is returned to the steam generator 32. One or more condensate pumps 48 between the condenser 36 and the steam generator 32 are in fluid communication with the steam generator 32 to provide the condensate 46 from the condenser 36 to the steam generator 32.

Typically, the warm-up of the steam turbine 34 and/or rotor 42 will require specific boundary conditions or operating limits for the steam generator 32 to ensure that the steam 40 provided to the steam turbine 34 will be within specific temperature and/or flow rate limits. In a combined cycle power plant 10 in which the gas turbine 12 provides the exhaust gases 38 to the steam generator 32, the required boundary conditions for the steam generator 32 result in associated boundary conditions for the gas turbine 12 so that the energy, temperature, and/or flow rate of exhaust gases 38 from the gas turbine 12 do not cause the steam generator 32 to exceed any boundary conditions. By directly controlling the energy, temperature, and/or flow rate of exhaust gases 38 from the gas turbine, it is anticipated that variations in the exhaust gas 38 parameters over a range of ambient temperatures will be reduced. Stated differently, the exhaust gas 38 characteristics will more accurately reflect boundary conditions for the gas turbine 12 than the previous surrogate parameters, such as gas turbine output, which typically vary over a range of ambient conditions and require additional validation over a range of ambient conditions.

Various embodiments of the present invention provide a model-based strategy for operating or controlling the gas turbine 12 to provide desired exhaust gases 38 to warm the steam turbine 34. As shown in FIG. 1, the gas turbine 12 may include a controller 50 operatively connected to various components of the gas turbine 12 to control the energy, temperature, and/or flow rate of the exhaust gases 38. The technical effect of the controller 50 is to thermodynamically model the gas turbine 12 output based on various measured operating parameters, ambient inputs, and/or initial conditions of the steam turbine 34. As used herein, the controller 50 may comprise any combination of microprocessors, circuitry, or other programmed logic circuit and is not limited to any particular hardware architecture or configuration. Embodiments of the systems and methods set forth herein may be implemented by one or more general-purpose or customized controllers 50 adapted in any suitable manner to provide the desired functionality. The controller 50 may be adapted to provide additional functionality, either complementary or unrelated to the present subject matter. For instance, one or more controllers 50 may be adapted to provide the described functionality by accessing software instructions rendered in a computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the systems and methods set forth and disclosed herein may also be implemented by hard-wired logic or other circuitry, including, but not limited to application-specific circuits. Of course, various combinations of computer-executed software and hard-wired logic or other circuitry may be suitable, as well.

The controller 50 may be operably coupled to various components of the gas turbine 12 and programmed to receive one or more measured input signals 52. The measured input signals 52 may reflect, for example, an operating parameter of the gas turbine 12, including, but not limited to a compressor inlet pressure or flow 54, a compressor discharge pressure, temperature, or extraction flow 56, a generator power output or loss 58, and/or a fuel flow rate or composition 60. In particular embodiments, the measured input signals 52 may reflect a measured ambient temperature or humidity 62 and/or a measured steam turbine temperature 64.

A thermodynamically representative model of the gas turbine 12 may reside in the controller 50. The model may be tuned to enhance the model's ability to accurately predict, forecast, or calculate the measured input signals 52, regardless of the current operating or ambient conditions. In this manner, the model may also provide an estimate of other operating parameters of the gas turbine 12 that are generally not measured, such as the energy, temperature, and/or flow rate of the exhaust gases 38. As previously described, the energy, temperature, and/or flow rate of the exhaust gases 38 may be used as boundary conditions for the gas turbine 12 that in turn prevent the steam turbine 34 from exceeding any boundary conditions.

The controller 50 processes the measured input signals 52 to generate appropriate outputs based on the thermodynamic model and/or discrete circumstances. In particular embodiments, the controller 50 may use a model predictive control (MPC) algorithm such as is described in commonly assigned U.S. Patent Publications 2007/0055392 or 2009/0292436, the entirety of each being fully incorporated herein for all purposes. Alternatively, the controller 50 may incorporate the thermodynamic algorithm more fully described in commonly assigned U.S. Pat. No. 7,742,904, the entirety of which is fully incorporated herein for all purposes. One of ordinary skill in the art will really appreciate that embodiments of the present invention are not limited to any particular thermodynamic model, algorithm, or program, and the controller 50 may utilize any algorithm and/or program that enables the system to function as described herein.

The controller 50 is also programmed to transmit one or more control signals to appropriate system components to ensure that the boundary conditions for the gas turbine 12, and thus the steam turbine 34, are not exceeded. For example, as shown in FIG. 1, the controller 50 may transmit an inlet guide vane signal 70 to adjust the compressor flow rate 54 and/or the compressor discharge pressure 56. Alternately or in addition, the controller 50 may transmit a fuel signal 72 to change the amount of fuel flow into the combustor 18. In either event, the control signals adjust the operation of the gas turbine 12 to achieve a desired energy, temperature, and/or flow rate of the exhaust gases 38 that will result in a more expedient, yet safe, warm-up of the steam turbine 34.

Figure 2:
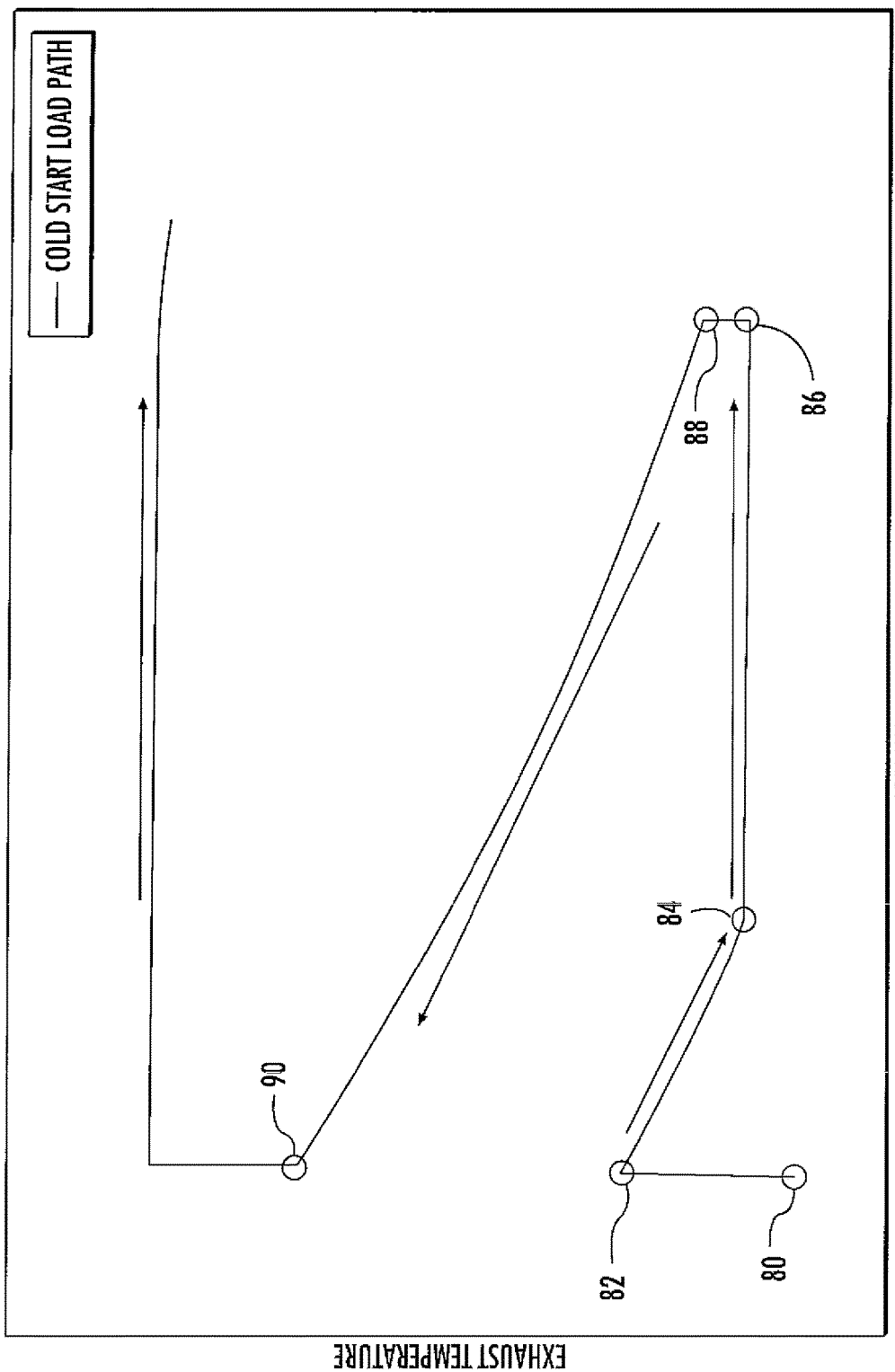
FIG. 2 is an exemplary temperature-flow profile for a cold start-up of a steam turbine according to one embodiment of the present invention.
Figure 3:
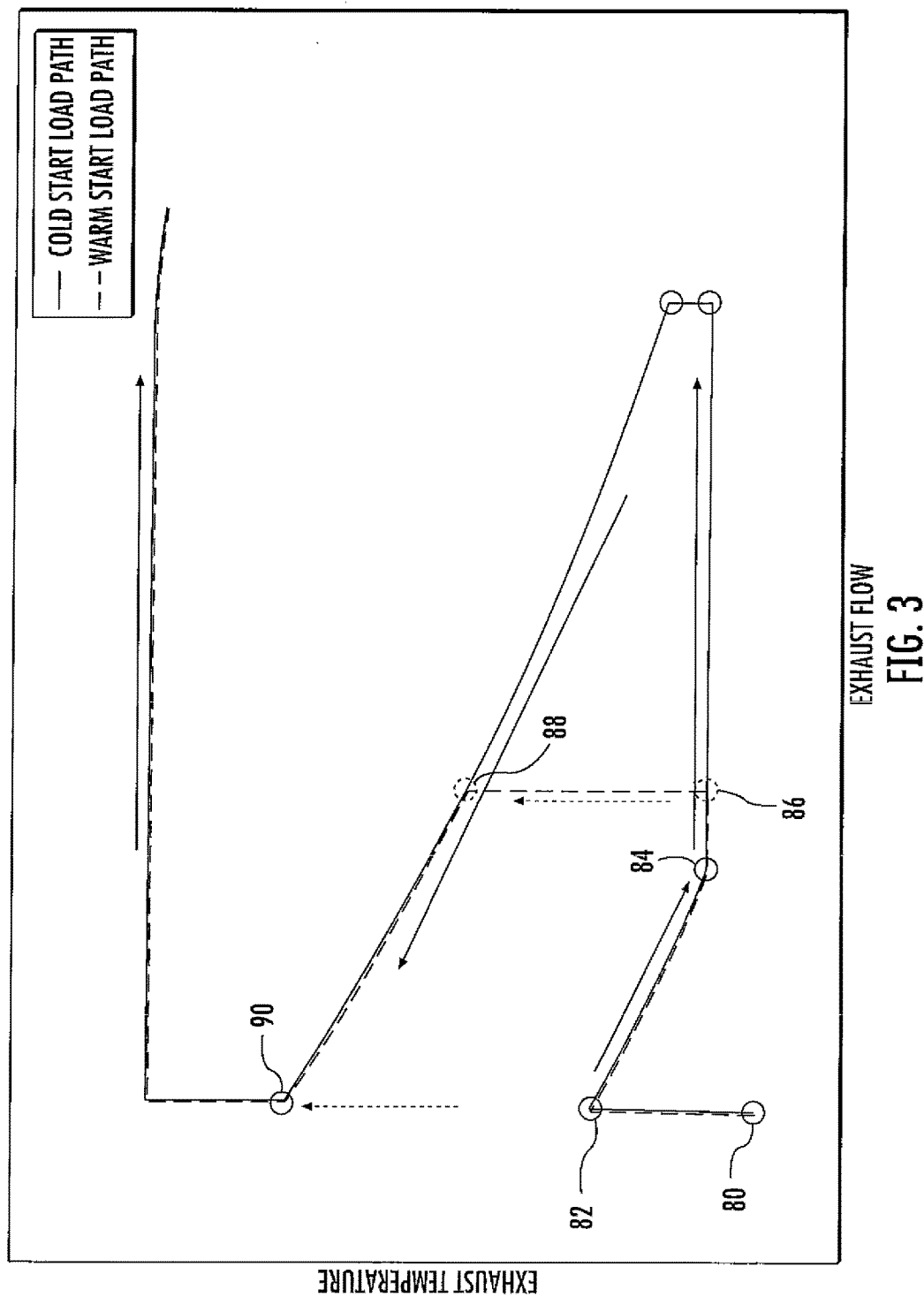
FIG. 3 is an exemplary temperature-flow profile for a warm or hot start-up of a steam turbine according to an alternate embodiment of the present invention.

The method or process for warming up the steam turbine 34 manages the heat-up rate of the steam turbine 34 by controlling the energy, temperature, and/or flow rate of the exhaust gases 38. In particular embodiments, the allowed heat-up rate and/or duration of the heat-up depend at least in part on the initial temperature of the steam turbine 34 and/or rotor 42. For example, FIG. 2 provides an exemplary temperature-flow diagram for a cold start-up of the steam turbine 34 having an initial temperature less than approximately 600-700° F., while FIG. 3 provides an exemplary temperature-flow diagram for a warm startup of the steam turbine 34 having initial temperature greater than approximately 700° F. In either case, the controller 50 may select the appropriate heat-up rate and temperature profile based on the measured steam turbine temperature 64. One of ordinary skill in the art will readily appreciate that the temperature-flow profiles shown in FIGS. 2 and 3 may change based on the particular steam turbine 34 and/or the number of discrete initial temperature conditions of the steam turbine 34, and the present invention is not limited to any particular temperature-flow profile or initial steam turbine temperature unless specifically recited in claims.

In general, the method for warming up the steam turbine 34 requires a reference steam temperature that is much lower than the steam turbine operating temperature for normal or unrestricted operations. Additionally, process controls associated with the steam turbine 34 may require a particular steam flow rate or steam turbine 34 power output as a permissive condition before continuing the warm-up process at higher steam temperatures. The reference steam temperature, steam flow rate, and steam turbine 34 power output are all directly related to the energy, temperature, and/or flow rate of the exhaust gases 38. As a result, the system may control the reference steam temperature, the steam flow rate, and the steam turbine 34 power output by controlling the energy, temperature, and/or flow rate of the exhaust gases 38.

As shown in the warm-up profile illustrated in FIG. 2, the process generally begins with the gas turbine 12 operating at a full speed, no load condition, as indicated by reference number 80. The steam turbine 34 warm-up may begin with a warm-up request, indicated by reference number 82. The warm-up request may be manual or automatic. For example, an operator may manually create the request or the controller 50 may automatically generate the request based on the measured steam turbine temperature 64. Upon receipt of the request, the controller 50 may generate a desired exhaust gas temperature based on the initial steam turbine temperature 64 and compare the desired exhaust gas temperature to the actual exhaust gas temperature as calculated by the thermodynamic model. If the desired exhaust gas temperature does not match the actual exhaust gas temperature, the controller 50 may generate the inlet guide vane signal 70 to reposition the inlet guide vanes 17 until the actual exhaust gas temperature equals the desired exhaust gas temperature, indicated by reference number 84.

Once the actual exhaust gas temperature equals the desired exhaust gas temperature, the controller 50 may generate a desired exhaust gas flow rate and compare the desired exhaust gas flow rate to the actual exhaust gas flow rate as calculated by the thermodynamic model. If the desired exhaust gas flow rate does not equal the actual exhaust gas flow rate, the controller 50 may generate the fuel signal 72 to adjust the fuel flow to the combustor 18 until the actual exhaust gas flow rate equals the desired exhaust gas flow rate, as indicated by reference number 86.

Once the controller 50 has matched the desired exhaust gas temperature and flow rate with the actual exhaust gas temperature and flow rate, the controller 50 may adjust the inlet guide vanes 17 and/or fuel flow to hold the exhaust gas temperature and flow rate constant for a specified period. After the specified period, represented by reference point 88, the controller generates the inlet guide vane and fuel signals 70, 72 required to maintain a constant exhaust gas energy while gradually increasing the exhaust gas temperature and decreasing the exhaust gas flow rate to heat up the steam turbine 34. At reference point 90, the inlet guide vanes 17 are at the minimum position, and the steam turbine 34 is fully warmed up and ready for unrestricted operations. The temperature-flow profile shown in FIG. 2 thus represents the desired combination of exhaust gas temperature and flow rate to achieve a suitable cold warm-up of the steam turbine 34.

As the exhaust gas temperature and flow rate and steam temperature and flow rate change during the warm-up, the gas turbine 12 and steam turbine 34 may constrain the warm-up rate. For example, the increase in the exhaust gas temperature between reference points 88 and 90 may be limited by combustor 18 ratings and/or emissions limits. In addition, multiple operating paths for the steam turbine 34 warm-up process add an additional required complexity to the control strategy. Therefore, a particular path from the initial warm-up condition back to the normal loading path (between reference points 88 to 90) with minimal variation about this operating path may be desired.

As shown in FIG. 3, the warm start-up of the steam generator 34 allows higher exhaust gas temperatures and lower exhaust gas flow rates compared to the cold start-up profile shown in FIG. 2. Specifically, it is anticipated that the loading of the gas turbine 12 will be along the normal operating path where a sufficient condition for the steam turbine 34 warm-up is largely driven by the exhaust gas temperature at the minimum exhaust gas flow rate. One of ordinary skill in the art will readily appreciate, however, that the particular temperature-flow profile for a warm start-up may vary according to particular operating and ambient conditions.

The various systems and methods described herein provide several advantages over existing techniques. For example, the algorithm and methods described herein may adjust to changes in the gas turbine 12 and heat recovery system 14 attributed to normal operations. In addition, the system and methods described herein may reduce the amount of time, thermal stresses, fuel consumption, and/or undesirable emissions associated with warming up the steam turbine 34, and one or more of these advantages may also lead to increased lifetimes and/or reduced maintenance of the steam turbine 34 and rotor 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for managing heat-up rate of a steam turbine via a gas turbine, the method comprising:
    operating the gas turbine at a full speed no load condition;
    estimating an actual exhaust gas temperature of an exhaust gas flowing from the gas turbine and into a heat exchanger disposed downstream from the gas turbine based on one or more measured operating parameters of the gas turbine, wherein the heat exchanger utilizes thermal energy from the exhaust gas to generate steam;
    measuring an initial temperature of the steam turbine;
    generating a preferred exhaust gas temperature, via a controller having a processor and memory, based upon the initial temperature of the steam turbine;
    routing the steam from the heat exchanger into a rotor portion of the steam turbine; and
    comparing, via the controller, the actual exhaust gas temperature to the preferred exhaust gas temperature, wherein if the actual exhaust gas temperature is not equal to the preferred exhaust gas temperature the method further comprises repositioning a plurality of inlet guide vanes disposed at an inlet of a compressor of the gas turbine until the actual exhaust gas temperature reaches the preferred exhaust gas temperature, and wherein once the exhaust gas temperature reaches the preferred exhaust gas temperature, the method further comprises:
        estimating an actual exhaust gas flow rate of the exhaust gas flowing from the gas turbine and into the heat exchanger based on the one or more measured operating parameters of the gas turbine;
        generating a preferred exhaust gas flow rate, via the controller, based upon the initial temperature of the steam turbine; and
        comparing, via the controller, the actual exhaust gas flow rate to the preferred exhaust gas flow rate, wherein if the actual exhaust gas flow rate is not equal to the preferred exhaust gas flow rate the method further comprises at least one of repositioning the plurality of inlet guide vanes and adjusting fuel flow to a combustor of the gas turbine until the actual exhaust gas flow rate and the actual exhaust gas temperature reaches the preferred exhaust gas flow rate and the preferred exhaust gas temperature.

2. The method as in claim 1, wherein the method further comprises adjusting the inlet guide vanes and the fuel flow to the combustor so as to maintain a constant exhaust gas energy level while increasing the actual exhaust gas temperature and decreasing the actual exhaust gas flow rate.

3. The method as in claim 1, wherein the initial temperature of the steam turbine is equal to or below seven hundred degrees Fahrenheit.

4. The method as in claim 1, wherein the initial temperature of the steam turbine is equal to or greater than seven hundred degrees Fahrenheit.

5. The method as in claim 1, wherein the steam from the heat exchanger is initially provided at a reference temperature that is less than a normal operating temperature of the steam turbine.

6. The method as in claim 1, wherein the one or more measured operating parameters of the gas turbine comprise a compressor inlet pressure, a compressor inlet flow, a compressor discharge pressure, a compressor discharge temperature, a compressor discharge flow, a generator power output or loss, a fuel flow rate, a fuel composition, an ambient temperature, an ambient humidity, or a combination thereof.

7. The method as in claim 1, wherein operating the gas turbine at a full speed no load condition comprises operating the gas turbine under start-up conditions.

8. The method as in claim 7, wherein the initial temperature of the steam turbine is a temperature of the steam turbine when the gas turbine is operating under the start-up conditions.

9. A system, comprising:
    a controller having a processor and memory, wherein the controller is configured to:
        estimate an actual exhaust gas temperature and an actual exhaust gas flow rate of an exhaust gas flowing from a gas turbine and into a heat exchanger disposed downstream from the gas turbine based on one or more measured operating parameters of the gas turbine;

measure an initial temperature of the steam turbine;
generate a preferred exhaust gas temperature and a preferred exhaust gas flow rate based upon the initial temperature of the steam turbine;
compare the actual exhaust gas temperature to the preferred exhaust gas temperature;
reposition a plurality of inlet guide vanes disposed at an inlet of a compressor of the gas turbine when the actual exhaust gas temperature is not equal to the preferred exhaust gas temperature until the actual exhaust gas temperature reaches the preferred exhaust gas temperature;
compare the actual exhaust gas flow rate to the preferred exhaust gas flow rate; and
reposition the plurality of inlet guide vanes, adjust fuel flow to a combustor of the gas turbine, or both when the actual exhaust gas flow rate is not equal to the preferred exhaust gas flow rate until the actual exhaust gas flow rate reaches the preferred exhaust gas flow rate and the actual exhaust gas temperature reaches the preferred exhaust gas temperature.

10. The system as in claim 9, wherein the controller is configured to adjust the inlet guide vanes and the fuel flow to the combustor so as to maintain a constant exhaust gas energy level while increasing the actual exhaust gas temperature and decreasing the actual exhaust gas flow rate.

11. The system as in claim 9, wherein the initial temperature of the steam turbine is equal to or below seven hundred degrees Fahrenheit.

12. The system as in claim 9, wherein the initial temperature of the steam turbine is equal to or greater than seven hundred degrees Fahrenheit.

13. The system as in claim 9, comprising the gas turbine, the steam turbine, and the heat exchanger, wherein the gas turbine comprises a compressor, a combustor, and a turbine.

14. The system as in claim 13, wherein controller is configured to operate the gas turbine under start-up conditions.

15. The system as in claim 14, wherein the initial temperature of the steam turbine is a temperature of the steam turbine when the gas turbine operates under the start-up conditions.

16. The system as in claim 13, wherein the heat exchanger is configured to utilize thermal energy from the exhaust gas to generate steam for the steam turbine.

17. The system as in claim 9, wherein the one or more measured operating parameters of the gas turbine comprise a compressor inlet pressure, a compressor inlet flow, a compressor discharge pressure, a compressor discharge temperature, a compressor discharge flow, a generator power output or loss, a fuel flow rate, a fuel composition, an ambient temperature, an ambient humidity, or a combination thereof.

18. A method for managing heat-up rate of a steam turbine via a gas turbine, comprising:
operating the gas turbine at a full speed no load condition;
estimating an actual exhaust gas temperature and an actual exhaust gas flow rate of an exhaust gas flowing from the gas turbine and into a heat exchanger disposed downstream from the gas turbine based on one or more measured operating parameters of the gas turbine;
measuring an initial temperature of the steam turbine;
generating a preferred exhaust gas temperature and a preferred exhaust gas flow rate based upon the initial temperature of the steam turbine;
comparing the actual exhaust gas temperature to the preferred exhaust gas temperature and the actual exhaust gas flow rate to the preferred exhaust gas flow rate; and
adjusting the actual exhaust gas temperature, the actual exhaust gas flow rate, or both when the actual exhaust gas temperature is not equal to the preferred exhaust gas temperature, the actual exhaust gas flow rate is not equal to the preferred exhaust gas flow rate, or both.

* * * * *